(12) United States Patent
Park

(10) Patent No.: US 9,594,360 B2
(45) Date of Patent: Mar. 14, 2017

(54) MOTOR STARTER WITH COMMUNICATION MODULE RESPONSIVE TO MAGNETIC CONTACTOR STATUS

(71) Applicant: LSIS CO., LTD., Anyang, Gyeonggi-Do (KR)

(72) Inventor: Ki Hun Park, Chungcheongbuk-Do (KR)

(73) Assignee: LSIS CO., LTD., Anyang (KR)

( * ) Notice: Subject to any disclaimer, the term of this patent is extended or adjusted under 35 U.S.C. 154(b) by 507 days.

(21) Appl. No.: 13/679,908

(22) Filed: Nov. 16, 2012

(65) Prior Publication Data
US 2013/0138228 A1    May 30, 2013

(30) Foreign Application Priority Data

Nov. 25, 2011 (KR) .................. 10-2011-0124329

(51) Int. Cl.
G05B 15/02 (2006.01)
G05B 19/042 (2006.01)

(52) U.S. Cl.
CPC ........... G05B 15/02 (2013.01); G05B 19/042 (2013.01); G05B 2219/21039 (2013.01); G05B 2219/21146 (2013.01)

(58) Field of Classification Search
None
See application file for complete search history.

(56) References Cited

U.S. PATENT DOCUMENTS

| 4,771,274 | A | * | 9/1988 | Havel | 345/690 |
| 5,245,616 | A | * | 9/1993 | Olson | 714/748 |
| 2008/0310057 | A1 | | 12/2008 | Kumfer et al. | |
| 2010/0085677 | A1 | | 4/2010 | Rivers et al. | |

FOREIGN PATENT DOCUMENTS

| EP | 1517347 | 3/2005 |
| JP | 06-189587 | 7/1994 |
| JP | 2009-123419 | 6/2009 |
| JP | 2010-93806 | 4/2010 |

OTHER PUBLICATIONS

Ametek/Sorenson XFR 2800 Watt Series Programmable DC Power Supply Manual, Feb. 2009, pp. 1-2, 1-3, 3-7, 3-8, Fig. 1-1.*
European Patent Office Application Serial No. 12191849.4, Search Report dated Sep. 20, 2013, 7 pages.
Japan Patent Office Application No. 2012-254290, Office Action dated Dec. 9, 2013, 4 pages.
Japan Patent Office Application No. 2012-254290, Office Action dated Oct. 8, 2014, 7 pages.

* cited by examiner

*Primary Examiner* — Mohammad Ali
*Assistant Examiner* — Bernard G Lindsay
(74) *Attorney, Agent, or Firm* — Lee, Hong, Degerman, Kang & Waimey

(57) ABSTRACT

A motor starter comprising a manual motor starter (MMS) is provided. The MMS comprises an MMS status input unit to receive a status of the MMS, a magnetic contactor (MC) status input unit to receive a status of a magnetic contactor, a communication unit connected via a wired cable to communicate data with a monitoring control console, and a controller to transmit MMS information received from the MMS status input unit and MC information received from the MC status input unit to the monitoring control console and to control the magnetic contactor based on a control signal received from the monitoring control console and the MC information.

8 Claims, 4 Drawing Sheets

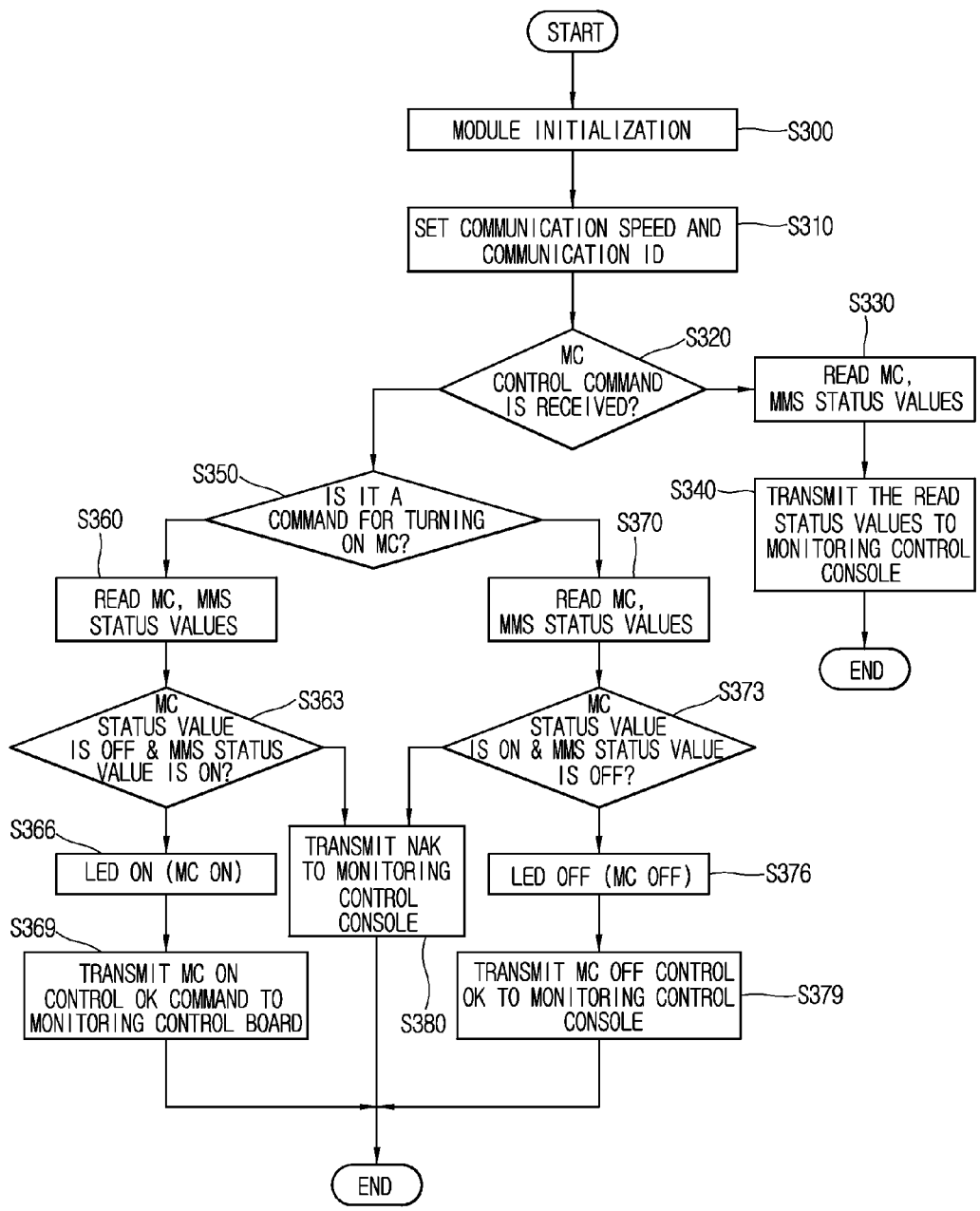

MOTOR STARTER WITH COMMUNICATION MODULE RESPONSIVE TO MAGNETIC CONTACTOR STATUS

CROSS-REFERENCE TO A RELATED APPLICATION

Pursuant to 35 U.S.C. §119(a), this application claims the benefit of earlier filing date and right of priority to Korean Patent Application No. 10-2011-0124329, filed on Nov. 25, 2011, the contents of which is incorporated by reference herein in its entirety.

BACKGROUND OF THE INVENTION

1. Field of the Invention

The present disclosure relates to a motor starter having a communication module, and more particularly, to a motor starter capable of monitoring and controlling an magnetic contactor provided in the motor starter from an monitoring console.

2. Description of the Conventional Art

Motor starter is a device including a manual motor starter (hereinafter, abbreviated as a "MMS") and a magnetic contactor (hereinafter, abbreviated as a "MC").

As a device used for electrical lines for which the rated voltage is under alternating current 690 V (frequency 50 or 60 Hz) or direct current 250 V, the MMS is an electric device provided at a front connection point of the motor to run or stop the motor. Furthermore, the MMS functions to open an electric power circuit connected to the motor when a fault current such as an over current, phase deficiency, an instant large current, or short circuit current occurs, thereby providing a function capable of protecting the motor from the fault current.

As well known, the MC is a device configured to open or close contacts by magnetizing or demagnetizing the electromagnet using a control signal, thereby supplying electric power to a load device such as a motor to operate the load device to run position or terminating power supply to operate the load device to stop position.

On the other hand, an example of a motor control system including a motor starter according to the related art will be described below with reference to FIG. 1.

A motor control system according to an example of the related art may include a programmable logic controller 10 (hereinafter, abbreviated as "PLC") for controlling control objects such as magnetic contactors, valves, fans, and the like, an input/output (hereinafter, abbreviated as "I/O") terminal unit 20 corresponding to an input/output terminal unit of the PLC 10, a terminal unit for connection 30 that provides a unit for signal-connecting the I/O terminal unit 20 with a plurality of motor starters 40, and the plurality of motor starters 40.

In a motor control system having the foregoing configuration according to an example of the related art, in order to run or stop a motor, the MC of the motor starter 40 corresponding to a power supply switch connected to the motor should be controlled by turning it on or off. Accordingly, in order to control the MC of the motor starter 40 to be turned on or off, the PLC 10 controls the MC of the motor starter 40 through the I/O terminal unit 20 and terminal unit for connection 30. In other words, the PLC 10, I/O terminal unit 20, and terminal unit for connection 30 are required to control the MC. Furthermore, in order to control the on/off of the MC, a status signal of the MC should be periodically received by the PLC 10, and an auxiliary relay connected to the MC through the I/O terminal unit 20 and terminal unit for connection 30 is controlled by the PLC 10 based on the status signal to control the on/off of the MC.

Accordingly, when a fault occurs in the PLC 10, the status of the MC is unable to be monitored and the on/off control of the MC is disabled, thereby having the possibility of causing a great damage on the motor and a facility driven by the motor.

Moreover, according to a motor control system in the related art, when an additional motor starter 40 is further installed for an additional function, the addition of the auxiliary relay, I/O terminal unit 20 and terminal unit for connection 30 may be necessary as well as an additional wiring work may be required, thereby causing an increase of the cost and an increase of the occupied space.

SUMMARY

Accordingly, the present disclosure is contrived to solve the foregoing problem, and an objective of the present disclosure is to provide a motor starter in which the status monitoring of the MC can be carried out in real time in an upper monitoring control console for the stable control of the MC, and the PLC, I/O terminal unit and terminal unit for connection are not required, and as a result, wirings between the relevant PLC and the I/O terminal unit and wirings between the units are not required.

In order to accomplish the foregoing object, there is provided a motor starter comprising a manual motor starter and a magnetic contactor, the motor starter comprising: an MMS status input unit configured to receive a status of the manual motor starter; an MC status input unit configured to receive a status of the magnetic contactor; a communication unit connected through a communication cable to communicate data with a monitoring control console; and a controller configured to transmit MMS information received from the MMS status input unit and MC information received from the MC status input unit to the monitoring control console, and control the magnetic contactor based on a control signal and the MC information when the control signal is received from the monitoring control console.

Furthermore, the controller may transmit a control complete message to the monitoring control console through the communication unit while at the same time normally controlling the magnetic contactor when the status information received from the MMS status input unit is on and the status information received from the MC status input unit is off upon receiving an command signal for controlling the MC to off position from the monitoring control console.

Furthermore, the controller may transmit a negative acknowledgement (hereinafter, abbreviated as "NAK") message to the monitoring control console through the communication unit without controlling the MC when the status information received from the MMS status input unit is off and the status information received from the MC status input unit is on upon receiving an command signal for controlling the MC to off position from the monitoring control console.

Furthermore, the controller may turn off the MC when the MMS status information is changed from on to off by periodically receiving status information from the MMS status input unit.

The motor starter may further include a first display unit configured to display a status of the motor starter, wherein the first display unit is configured by a light emitting diode (LED) or 7-segment.

Furthermore the motor starter may further include a switch configured to set a communication identifier (hereinafter, abbreviated as "ID") of the communication unit or set a communication speed thereof.

Furthermore, the motor starter may further include a power supply unit configured to supply electric power to the motor starter.

Furthermore, the power supply unit may include a second display unit configured to display a status of the electric power supplied to the motor starter.

Furthermore, the second display unit may display whether a voltage input to the motor starter is a low voltage, a voltage having a size of 110 V, a voltage having a size of 220 V, or an overvoltage.

Furthermore, the second display unit may be configured with a light emitting diode (LED) to display it with a different color in a distinguished manner according to the status of the voltage input to the motor starter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flow chart illustrating a method of operating a motor starter according to an exemplary embodiment of the present disclosure.

DETAILED DESCRIPTION

As various modifications can be made and diverse embodiments are applicable to the present invention, specific embodiments will be illustrated with reference to the accompanying drawings and described in detail in the detailed description. However, those specific embodiments should not be construed to limit the present invention, and should be construed as being extended to all modifications, equivalents, and substitutes included in the concept and technological scope of the invention.

In describing the present invention, moreover, the detailed description will be omitted when a specific description for publicly known technologies to which the invention pertains is judged to obscure the gist of the present invention.

Figure 1:
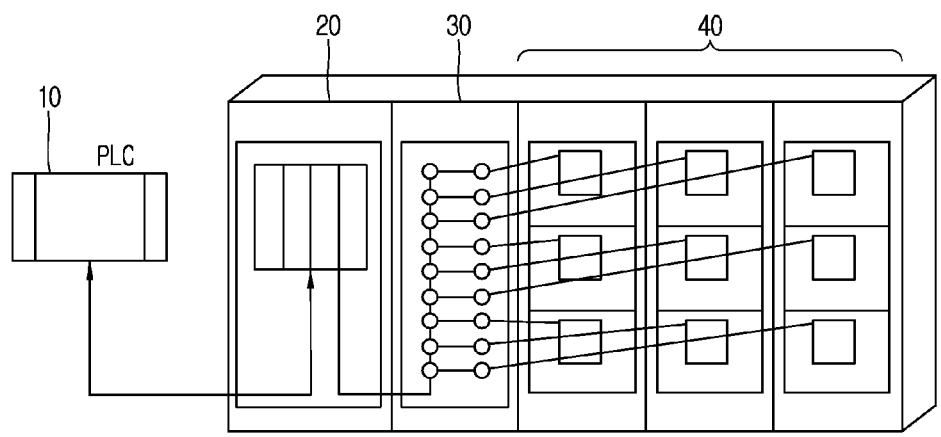
FIG. 1 is a schematic view illustrating a motor control system including a motor starter in the related art.
Figure 2:
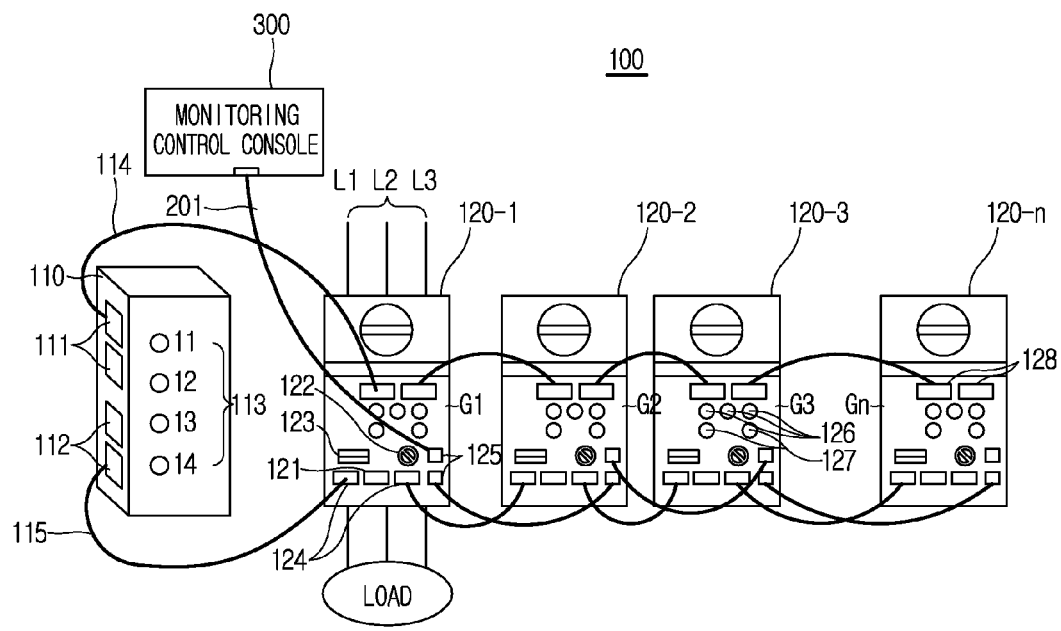
FIG. 2 is a schematic view illustrating the configuration of a motor control system including a motor starter according to an exemplary embodiment of the present disclosure.

FIG. 2 is a schematic view illustrating the configuration of a motor control system including a motor starter according to an exemplary embodiment of the present disclosure. Specifically, a plurality of motor starters 120-1, 120-2, 120-3, . . . , 120-n and a monitoring control console 300 constitutes a motor control system. In addition, the motor control system may further include a power supply unit 110 for supplying electric power to the plurality of motor starters 120-1, 120-2, 120-3, . . . , 120-n.

The motor starters 120-1, 120-2, 120-3, . . . , 120-n may include communication modules G1, G2, G3, . . . , Gn, and the monitoring control console 300 which is communication-connected to any one of the communication modules G1, G2, G3, . . . , Gn can monitor the status of the motor starters 120-1, 120-2, 120-3, . . . , 120-n.

The motor starters 120-1, 120-2, 120-3, . . . , 120-n may include an MMS and an MC, respectively, as described in the description of the background technology.

The MMS is an electronic device provided nearer to an Alternating Current (abbreviated as "AC" hereinafter) electric power source than the motor to run or stop the motor, and used in an electric power line under the rated voltage of AC 690 Volts (frequency 50 or 60 Hz) or Direct Current (abbreviated as "DC" hereinafter) 250 Volts (abbreviated as "V" hereinafter) as described above. Furthermore, the MMS is a device also called a manual motor starter, and provided between the electric power source and the motor to be operated to open the circuit when a fault current occurs due to an over current, phase deficiency, an instant large current, or short circuit current, thereby protecting the circuit and motor.

Furthermore, as well known or as described above, the MC is a device configured to open or close a contact by magnetizing or demagnetizing the electromagnet using a control signal, thereby supplying electric power to a load device such as a motor to operate the load device to run position or terminating power supply to operate the load device to stop position.

Contrary to a Programmable Logic Controller for automatically controlling quite various control objects such as magnetic contactors, valves, fans, and the like, the monitoring control console 300 is a motor control and monitoring dedicated controller to allow the user to run or stop only a plurality of motors or monitor the operation status of motor starters.

The monitoring control console 300 is connected to each of the motor starters 120-1, 120-2, 120-3, . . . , 120-n through a communication cable 201.

Furthermore, communication connection between the motor starters 120-1, 120-2, 120-3, . . . , 120-n may be also accomplished by connecting the communication modules G1, G2, G3, . . . , Gn of the motor starters through communication cables. Each of the motor starters 120-1, 120-2, 120-3, . . . , 120-n has a communication cable connection terminal 125 capable of connecting between the monitoring control console 300 and the motor starter through a communication cable or connecting the motor starters through a communication cable.

Furthermore, the communication modules G1, G2, G3, . . . , Gn may include a signal line connection terminal 121 for controlling the MC, and may further include a switch 122 for setting a communication identifier (abbreviated as "communication ID" hereinafter), and a switch 123 for setting a communication speed.

Furthermore, each of the communication modules G1, G2, G3, . . . , Gn may include a first display unit 126 for displaying the on/off of the MC, or displaying whether or not the communication status is normal, or displaying whether or not communication modules G1, G2, G3, . . . , Gn are normally operated. Furthermore, each of the communication modules G1, G2, G3, . . . , Gn may further include a manual control switch 127 for turning on or off the MC.

The first display unit may be configured by a light emitting diode (LED) or 7-segment.

According to the wired communication method, each of the motor starters 120-1, 120-2, 120-3, . . . , 120-n are connected to the monitoring control console 300 through a communication cable as described above, and the monitoring control console 300 receives a signal indicating the status of the MC from each of the motor starters 120-1, 120-2, 120-3, . . . , 120-n through the communication cable, thereby monitoring each of the motor starters 120-1, 120-2, 120-3, . . . , 120-n in real time.

The process of allowing the monitoring control console 300 to monitor the status of the MC provided in each of the motor starters 120-1, 120-2, 120-3, . . . , 120-n will be described below in more detail.

On the other hand, a motor control system 100 including a motor starter according to the present disclosure may further include a power supply unit 110 for supplying electric power to each of the motor starters 120-1, 120-2, 120-3, . . . , 120-n as illustrated in FIG. 2.

The power supply unit 110 supplies the operation power of DC 100 V or 220 V to the entire motor control system 100. Furthermore, the motor control system 100 also supplies the electric power of DC 12 V to directly supply the DC power source of electronic components contained in each of the motor starters 120-1, 120-2, 120-3, . . . , 120-n.

The motor starters 120-1, 120-2, 120-3, . . . , 120-n may include a first power source terminal 128 for receiving the electric power of DC 12 V and a second power source terminal 124 for receiving the electric power of DC 110/220 V.

The power supply unit 110 also has a first output terminal 111 for supplying the electric power of DC 12 V and a second output terminal 112 for supplying the electric power of DC 110/220 V, and is connected to the first power source terminal 128 and second power source terminal 124 of the motor starters 120-1, 120-2, 120-3, . . . , 120-n through connection cables 114, 115 to supply DC electric power.

The power supply unit 110 may further include a second display unit 113 for displaying the status of electric power supplied to motor starters 120-1, 120-2, 120-3, . . . , 120-n. The second display unit 113 allows the user to check whether or not the electric power currently being supplied to motor starters 120-1, 120-2, 120-3, . . . , 120-n is normal, thereby preventing operation errors and accidents in advance.

Specifically, the second display unit 113 may include a display unit indicating whether or not the supplying electric power is in a low voltage state, a display unit indicating whether or not the supplying electric power is 110 V (displayed to be turned on when the supplying electric power voltage is a voltage within a range of tolerance of DC 110 V or displayed to be turned off when it is out of the range of tolerance), a display unit indicating whether or not the supplying electric power is 220 V (displayed to be turned on when the supplying electric power voltage is a voltage within a range of tolerance of DC 220 V or displayed to be turned off when it is out of the range of tolerance), and a display unit indicating whether or not the supplying electric power is in an overvoltage state (displayed to be turned on when the supply power voltage is greater than a predetermined reference voltage of the overvoltage or displayed to be turned off when it is equal to or less than the reference voltage of the overvoltage). Furthermore, the display unit may be configured by a light-emitting diode (LED). On the other hand, each LED may exhibit a different kind of color, thereby allowing the user to intuitively check the status of the power supply.

The power supply unit 110 having the foregoing configuration may supply electric power to motor starters 120-1, 120-2, 120-3, . . . , 120-n as well as notify the status of the supplied electric power to the user, thereby allowing the user to cope with an event when the status of the supplied electric power is abnormal.

Figure 3:
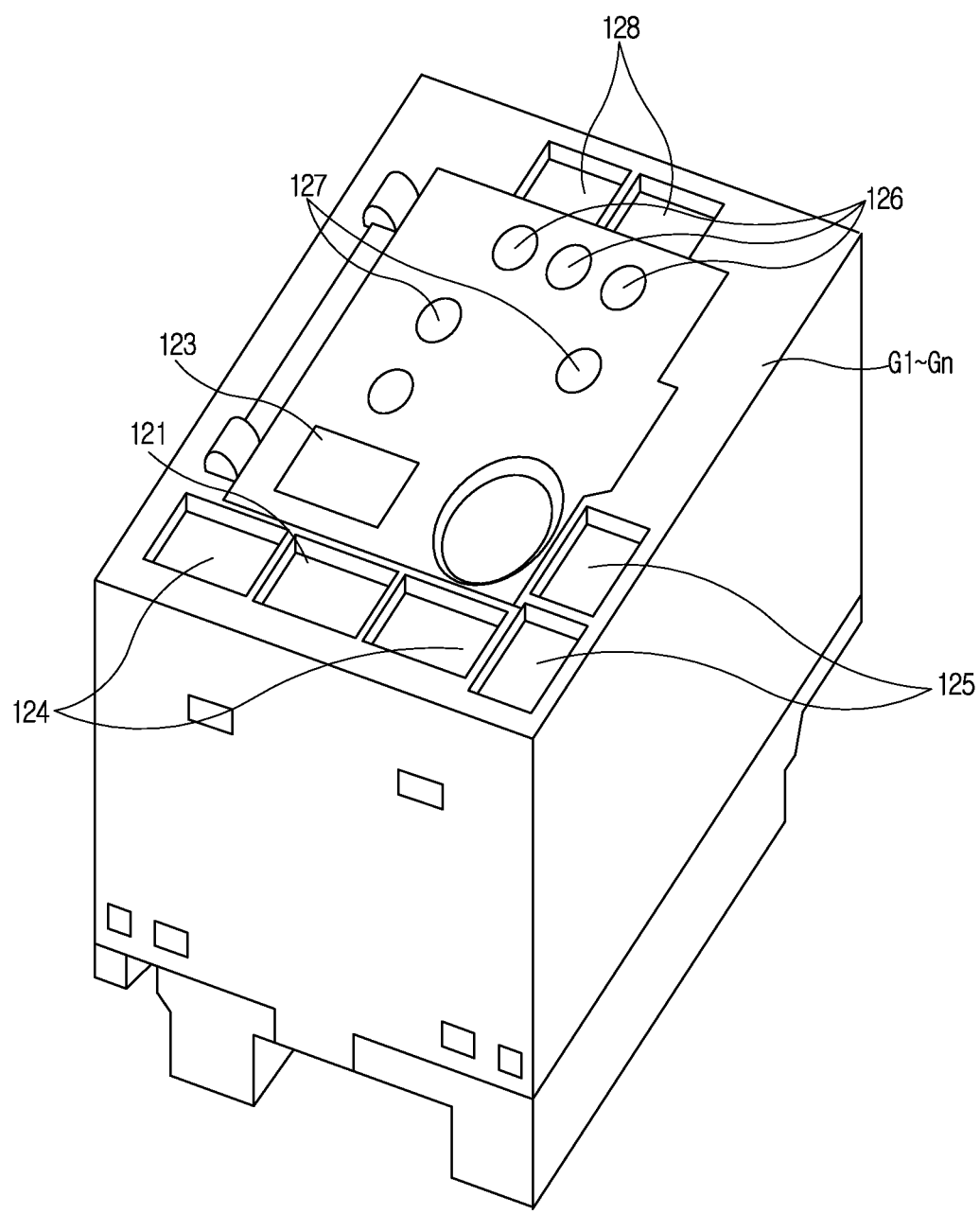
FIG. 3 is a perspective view illustrating the configuration of a communication module provided in a motor starter in detail according to an exemplary embodiment of the present disclosure.

FIG. 3 is a perspective view illustrating the configuration of communication modules G1, G2, G3, . . . , Gn only provided in a motor starter according to an embodiment of the present disclosure. Here, reference numerals in FIG. 3 use the same reference numerals in FIG. 2 if they correspond to each other.

As illustrated in FIG. 3, a motor starter according to an embodiment of the present disclosure may include communication modules G1, G2, G3, . . . , Gn capable of performing communication with the monitoring control console 300 and the other motor starters, and the communication modules G1, G2, G3, . . . , Gn may include a connection terminal 121 connected to a signal line for controlling the MC; a switch 122 for setting a communication ID; a switch 123 for setting a communication speed; a second power source terminal 124 for receiving the electric power of DC 110/220 V; a communication cable connection terminal 125 for connecting a communication cable between each of the motor starters 120-1, 120-2, 120-3, . . . , 120-n; a first display unit 126 for displaying the on/off of the MC, whether or not the communication status is normal, and whether or not the communication module is normally operated; a manual control switch 127 for operating the MC to be turned on or off manually; and a first power source terminal 128 for receiving the electric power of 12 V as illustrated in FIG. 3.

However, the configuration of communication modules G1, G2, G3, . . . , Gn illustrated in FIG. 3 may be merely one embodiment, and of course, may be also configured in a different manner. In particular, the arrangement of each terminal and display unit may be also arranged in a different manner if it has the same function.

Figure 4:
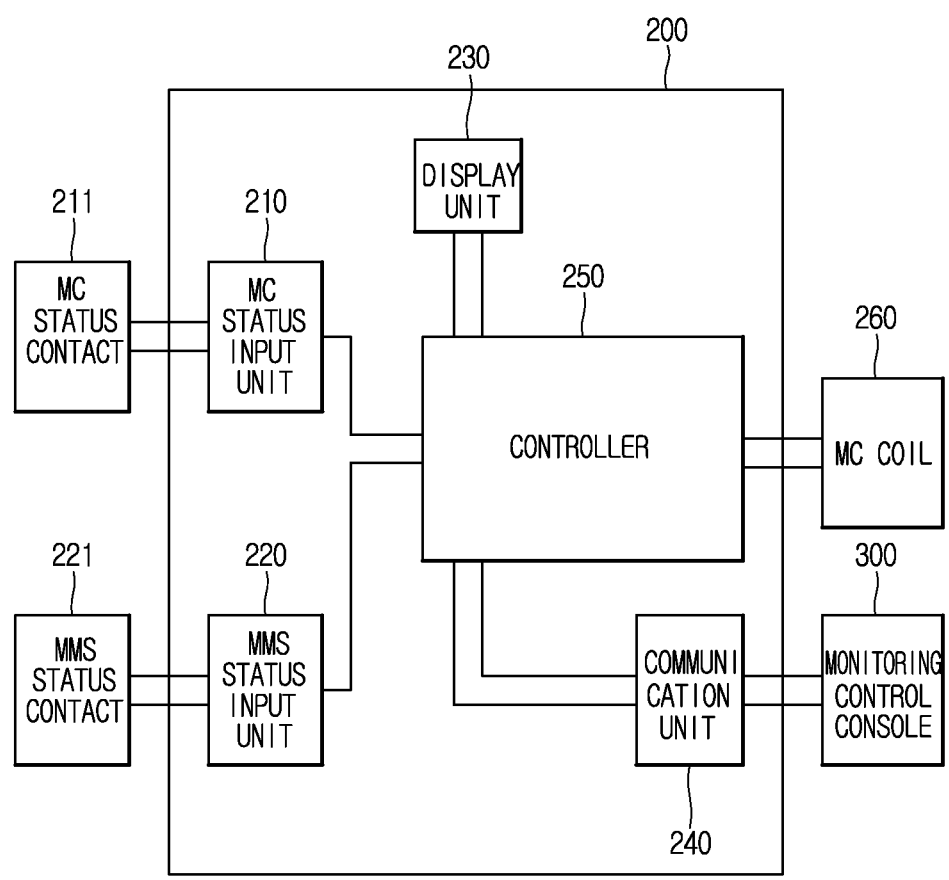
FIG. 4 is a functional block diagram illustrating the configuration of a control function unit of a motor starter according to an exemplary embodiment of the present disclosure.

FIG. 4 is a functional block diagram illustrating the configuration of an internal functional blocks in the communication module of a motor starter according to an exemplary embodiment of the present disclosure.

In FIG. 4, it should be noted that reference numeral 200 is designated to the communication module of the motor starter contrary to the existing reference numerals "G1, G2, G3, . . . , Gn".

As illustrated in the drawing, the communication module 200 of a motor starter according to an exemplary embodiment of the present disclosure may include an MC status input unit 210, an MMS status input unit 220, a display unit 230, a communication unit 240, and a controller 250.

The MC status input unit 210 is connected to an MC status contact 211 of the MC to receive status information (hereinafter, referred to as "MC status information").

The MMS status input unit 220 is connected to an MMS status contact 211 of the MMS to receive status information (hereinafter, referred to as "MMS status information").

The display unit 230 has a function of displaying the on/off of the MC, whether or not the communication status is normal, and whether or not the communication module is normally operated.

The communication unit 240 has a function of transmitting MC status information received through the MC status input unit 210 and status information received through the MMS status input unit 220 to the monitoring control console 300. The communication unit 240 is connected to the monitoring control console 300 through the communication cable 201, and transmits status information to the monitoring control console 300 under control of the controller 250 which will be described later when there is a request from the monitoring control console 300.

When an command signal for operating the MC to be turned on is transmitted from the monitoring control console 300 to the communication module 200 of the motor starter, the controller 250 reads the MC status information and MMS status information, and transmits an ON command signal to the MC coil (in other words, magnetic coil) 260 when the current MC status information is off and the MMS status information is on, namely, when the MC is in an opened switching status and the MMS is in a closed switching status, thereby operating the MC to be in an ON status, namely, in a closed switching status while at the same time transmitting a control complete report signal to the monitoring control console 300.

On the contrary, when an command signal for operating the MC to be turned on is transmitted from the monitoring control console 300 to the communication module 200 of the motor starter, the controller 250 transmits an NAK message indicating a negative response to the monitoring control console 300 without transmitting an ON command signal to the MC coil 260 of the MC when the MC status information is on and the MMS status information is off in advance.

Furthermore, when an command signal for operating the MC to be turned off is received from the monitoring control console 300, the controller 250 reads the MC status information and MMS status information, and normally performs the transmission of a control command signal and transmits a control complete report signal to the monitoring control console 300 when the current MC status information is on and the MMS status information is off. In other words, the controller 250 transmits an OFF command signal to the MC coil 260 to demagnetize the MC coil 260, thereby operating the MC to be in an off state, namely, in a opened switching status and transmitting a control complete report signal to the monitoring control console 300

On the other hand, when an command signal for operating the MC to be turned off is transmitted from the monitoring control console 300, the controller 250 reads the MC status information and MMS status information, and transmits an NAK message to the monitoring control console 300 without performing the transmission of a control command signal when the MC status information is off and the MMS status information off.

On the other hand, when an command signal for operating the MC to be turned off is received from the monitoring control console 300, the controller 250 periodically receives the MMS status information from the MMS status contact 221 of the MMS, and if the current MC status information is on when the MMS status information is changed from on (closed switching status) to off (opened switching status), the controller 250 transmits an off command signal to the MC coil 260 of the MC to demagnetize the MC coil 260, thereby operating the MC to be in an off state, namely, in a opened switching status.

Owing to the foregoing configuration, the monitoring control console 300 may control the MC while monitoring the MC status information and MMS status information in real time, thereby enhancing the stability of a motor control system.

Finally, FIG. 5 is a flow chart illustrating the operating of the motor starter according to an exemplary embodiment of the present disclosure.

The controller 250 first initializes the module (S300) and sets a communication speed and communication ID (S310). Then, the controller 250 determines whether or not an MC control command signal is received from the monitoring control console 300 (S320). If the MC control command signal is not received (S320-No), then the status values of the MC and MMS are read (S330), and the read status values are transmitted to the monitor console (S340). The operation process may be carried out by the MC status input unit 210 and MMS status input unit 220.

When the MC control command signal is received (S320-Yes), it is determined again by the controller 250 whether it is an command signal for turning on the MC or turning off the MC (S350). If it is an command for turning on the MCD (S350-Yes), then the status values of the MC and MSS are read (S360).

If the status value of the MC is off and the status value of the MMS is on (S363-Yes), the MC is operated in an ON status and the LED is turned on (S366).

Furthermore, an ON control complete report signal (i.e., ON control complete message) is transmitted from the controller 250 to the monitoring control console 300 (S369).

On the contrary, if it is an command signal for turning on the MC but the status value of the MC is off and the status value of the MMS is off (S363-No), then an NAK message is transmitted to the monitoring control console to notify that an command error has occurred (S380).

On the contrary, when an command signal for turning off the MC is received (S350-No), the status values of the MC and MMS are first read (S370), and if the status value of the MC is on and the status value of the MMS is off (S373-Yes), the MC is turned off and the LED indicating the operation status of the MC is turned off (S376). Then, a message indicating that the MC is turned off, namely, an OFF control complete report signal is transmitted to the monitoring control console (S379). On the contrary, if it is an command signal for turning off the MC but the status value of the MC is on and the status value of the MMS is on (S373-No), then an NAK message is transmitted to the monitoring control console 300 to notify that an command error has occurred (S380).

According to the foregoing configuration, an upper monitoring control console may monitor the status of the MC in real time, thereby allowing the stable control of the MC and solving problems such as the cost increase or space limitation.

As described above, each constituent element and/or function described in various embodiments may be combined with one another and configured in an integrated manner, and various modifications and improvements will become apparent to those skilled in the art without departing from the concept and scope of the present invention as defined in the following claims.

What is claimed is:

1. A communication module of a motor starter, the motor starter comprising a manual motor starter (MMS) and a magnetic contactor (MC), the communication module comprising:
   an MMS status input unit connected to an MMS status contact of the MMS and configured to receive status information of the MMS;
   an MC status input unit configured to receive status information of the MC;
   a communication unit connected to a monitoring control console via a communication cable and configured to communicate data with the monitoring control console;
   a switch configured to set a communication speed of the communication unit; and
   a controller configured to:
   transmit the received status information of the MMS and the received status information of the MC to the monitoring control console;

determine whether to move the MC in response to a command signal received from the monitoring control console based on the received status information of the MC;

transmit a control complete message to the monitoring control console via the communication unit while controlling the MC to operate normally in an on state upon receiving a command signal from the monitoring control console for controlling the MC to be turned on when the received status information of the MMS indicates an on state and the received status information of the MC indicates an off state; and transmit a command error generation message to the monitoring control console via the communication unit without controlling the MC upon receiving a command signal from the monitoring control console for controlling the MC to be turned on when the received status information of the MMS indicates an off state and the received status information of the MC indicates an on state.

2. The communication module of claim 1, wherein the controller is further configured to periodically receive changed status information of the MMS from the MMS status input unit.

3. The communication module of claim 1, further comprising:
a display unit configured to display a status of the motor starter,
wherein the display unit comprises a light emitting diode (LED) or 7-segment display.

4. The communication module of claim 1, further comprising:
a power supply unit configured to supply electric power to the motor starter.

5. The communication module of claim 4, wherein the power supply unit comprises:
a display unit configured to display a status of the supplied electric power.

6. The communication module of claim 5, wherein the status of the supplied electric power is at least a low voltage, a voltage within a tolerance of direct current 110 Volt, a voltage within a tolerance of direct current 220 Volt, or an overvoltage.

7. The communication module of claim 5, wherein the display unit comprises a light emitting diode (LED) configured to display a different color according to the status of the supplied electric power.

8. The communication module of claim 1, wherein:
the controller is further configured to control the MC based on the received control signal, the received status information of the MC and the received status information of the MMS; and
the received status information of the MC indicates the on state of the MC or the off state of the MC; and
the received status information of MMS indicates the on state of the MMS or the off state of the MMS.

* * * * *